March 6, 1951     H. M. ROESER     2,543,806
MOTION WEIGHING
Filed Feb. 26, 1945     3 Sheets-Sheet 1
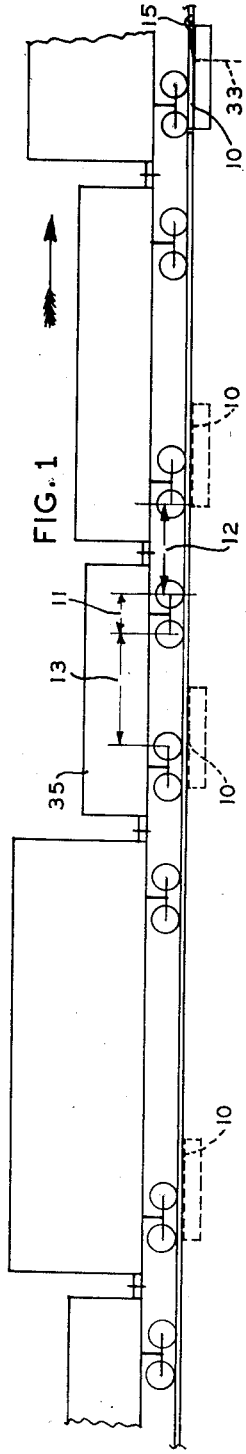
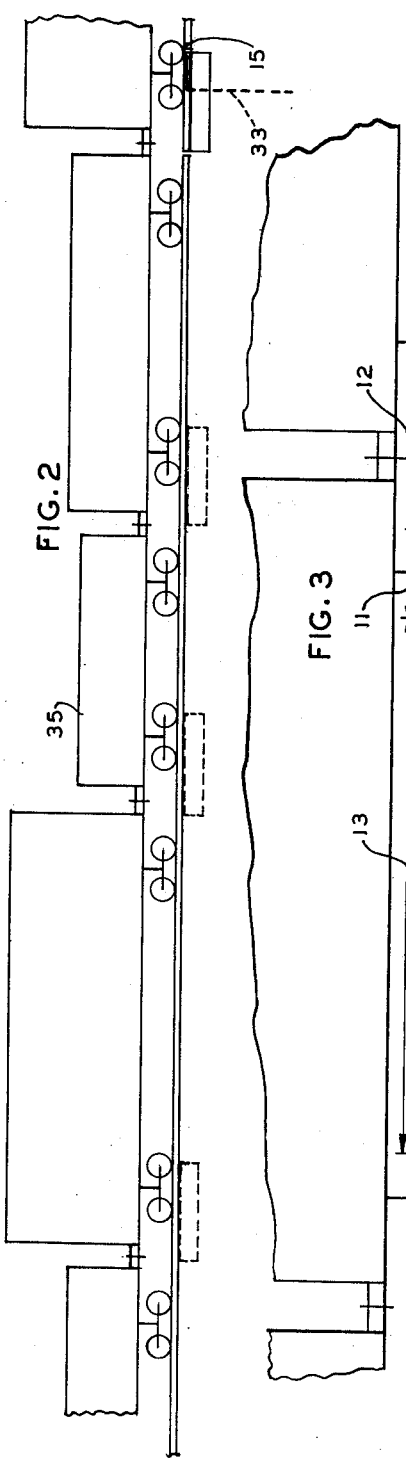
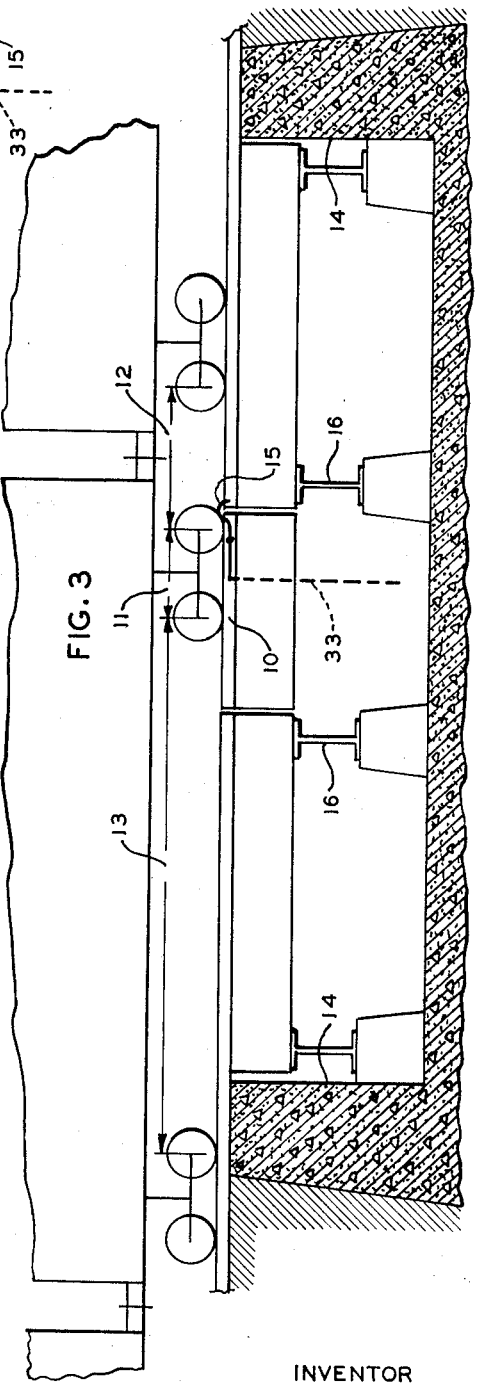
INVENTOR
HARRY M. ROESER
BY *Roland C. Kehn*
ATTORNEY

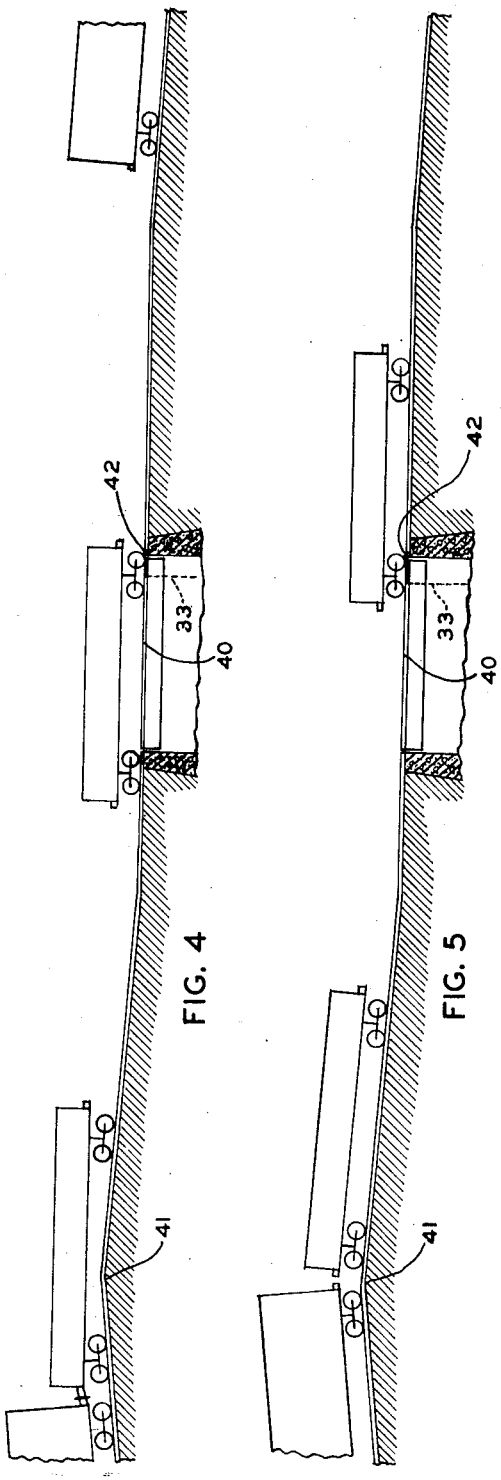

March 6, 1951     H. M. ROESER     2,543,806
MOTION WEIGHING
Filed Feb. 26, 1945     3 Sheets-Sheet 3
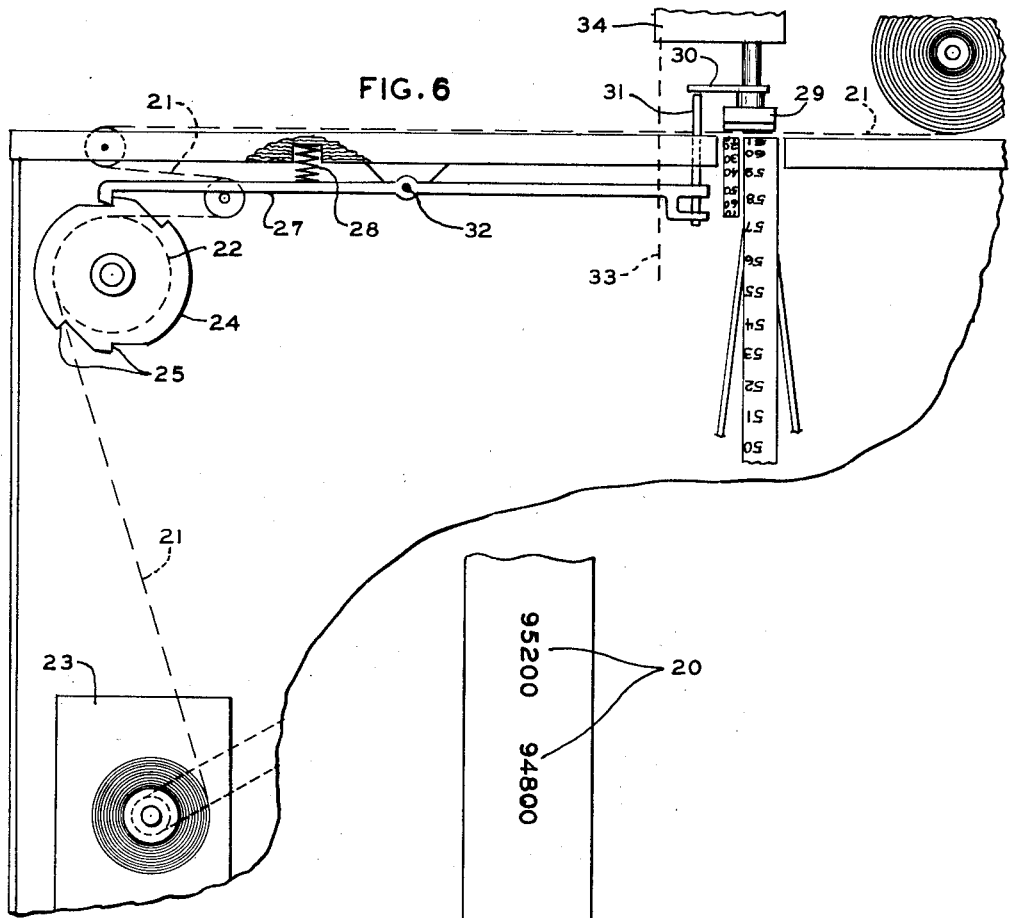
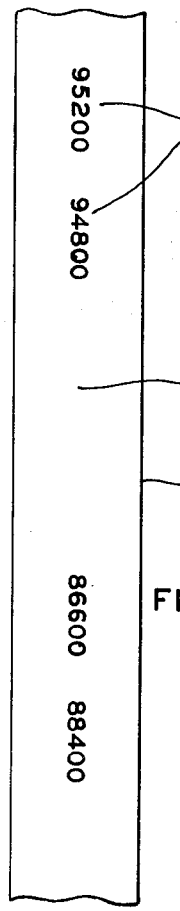
INVENTOR
HARRY M. ROESER
BY
ATTORNEY Patented Mar. 6, 1951

2,543,806

UNITED STATES PATENT OFFICE 2,543,806

MOTION WEIGHING

Harry M. Roeser, Chicago, Ill., assignor to Streeter-Amet Company, Chicago, Ill., a corporation of Illinois Application February 26, 1945, Serial No. 579,711

7 Claims. (Cl. 265—27)

This invention relates to motion weighing, and among other objects aims to improve the method of and means for weighing cars in motion.

The nature of the invention may be readily understood by reference to exemplary methods and the apparatus for performing the methods and illustrated in the accompanying drawings:

In said drawings:

Fig. 1 is a diagram illustrating a method of weighing cars coupled in a train;

Fig. 2 is a similar diagram at a different stage in the method;

Fig. 3 is an enlarged elevation partly in section showing details of the weighing apparatus;

Fig. 4 is a diagram illustrating the method of weighing cars in motion but uncoupled;

Fig. 5 is a similar view illustrating the method at a lower stage;

Fig. 6 is a view showing the mechanism for identifying printed weight records;

Fig. 7 is a view showing a sample of a weight record illustrating the method of identifying the record of the weights.

The great changes and advances made in railroad car design have considerably complicated the already difficult problem of weighing cars. Freight cars now vary in overall and wheelbase lengths from about 20 to 65 and 70 feet, and the increasing use of light weight alloys suggests the possibility of even greater variation. Many of these cars are already too long to be weighed on many existing scales; and even when they can be accommodated on the scale they cannot be weighed in motion since they would not be scale borne for a sufficient length of time to permit the scale to balance. Such cars must be stopped or nearly stopped on the scale, thereby greatly impairing the efficiency of weighing. Increase in scale length is no solution of the problem. In most cases freight yard layout and available space precludes installation of a substantially longer scale. But even if the scale were not long enough to accommodate the longest car, cars of greatly varying length cannot be weighed thereon when coupled in a train, since the shorter cars can never rest alone on the scale; and in any event the great changes in speed of the entire train necessary to permit cars of varying length to be scale borne alone for a sufficient length of time, practically prevents weighing cars coupled in a train despite the many advantages of this practice. Today weighing of cars coupled in a train is practically confined to cars of uniform and limited length with reference to the scale length.

The result is that with the exception of the special instance just noted cars have been weighed uncoupled despite the fact that heretofore it has been wasteful of man and motive power and hazardous to personnel. For example, in so-called gravity or "hump" weighing, a car whose wheelbase approximates the length of the scale weighrails must be specially handled. Such a car must be slowed down by special maneuvers with the locomotive at the time the car is cut off (preparatory to weighing) or a rider must be put on the car. Then motion must be arrested altogether, either with the locomotive (and this means stopping the whole train) or with hand brakes. In cold weather cars brought substantially to a standstill will not start themselves and hard running cars will not start in any season. This requires forward and reverse travel of the locomotive and entire train, otherwise men must stand around with pinch bars to start such cars; and, of course, the cars must be coupled together whenever the locomotive is used to control or arrest car speed. If manually controlled, a man must mount the car while moving to operate the hand brake. If it must be brought to a standstill he must thereafter climb down, start it with a pinch bar, then climb up again to control the motion of the car with the hand brakes. These practices are a common cause of fatalities and injuries. Even uncoupling of each car at the "hump" before it runs onto the scale is not as simple as it may appear. The car can only be uncoupled at the instant the coupler passes the apex of the "hump" for only then is the pressure off the coupling pin. A man must be on the spot at this instant; he must then follow the car to hold up the coupler pin until the car breaks away; and then he must run back to the next coupling in time to catch it at the instant when the pin is loose. In other words, he must travel the equivalent of about two lengths for uncoupling each car.

The present invention makes possible the weighing of cars of varying length coupled in a train and in motion with safety to personnel, economy of man and motive power, and smoothness of operation. According to another method presently described, the cars may be weighed uncoupled and in motion with similar economy and safety to personnel. As here shown, the cars are weighed one truck at a time on a scale whose length is less than the minimum car wheelbase. In "coupled" weighing, the length of the weighrail 10 (i. e., the weighing part of the scale) is (roughly) less than the sum of the wheelbase 11 of a single truck and the minimum outboard distance 12 i. e., the distance betwen adjacent wheels of adjacent cars but enough longer than the truck wheelbase 11 to permit the truck to be scale borne alone long enough for proper weighing before the following truck engages the weighrail. Generally the outboard dimension is less than the minimum wheelbase length 13, and therefore controls (together with truck wheelbase length) in determining weighrail length.

The weight carried by each truck is advantageously recorded, and with mechanism presently described the recorded weights for trucks of each car are identified to avoid confusion.

As will presently appear the invention makes it possible to utilize existing scale-equipment with minor alterations and with little expense, thereby making it possible to adapt heretofore inadequate equipment for weighing safely, economically, and smoothly, cars of greatly varying lengths.

In "coupled" weighing the length of the weighrail 10, which in the present case is about 12½ feet, is substantially shorter than the length of the shortest existing railroad car scale, and the old scale pit 14 may therefore advantageously be employed for the new installation. Substantial economies may be effected by using a single span (which usually will be little longer than required) of the old track scale. This permits an economical and relatively simple construction and does not unduly increase the effective length of the weighrail, since the track lever 15 or its equivalent (actuated by engagement of the car wheels to operate the weight recorder) may if necessary be set inwardly of the far end of the weighrail sufficiently to be operated by the truck wheel before the following truck engages the weighrail. The surplus length of the old scale pit may be either filled in or, as shown here, bridged by approach rails carried on appropriate supporting structure 16. With minor alterations, the existing scale lever system on the old scale may be employed for the new scale. The wheel counting mechanism, which heretofore actuated the recorder only after passing of four wheels, is readily altered to actuate it after the passage of two wheels.

Actuation of the recorder at the proper time may be affected in various ways, all well known. Details of an apparatus which may be adapted for the present method are shown in Wiley Patent 1,581,771.

The recorded weight for the pair of trucks of each car is identified in this case by segregating the record in pairs 20 as illustrated, for example, in Fig. 7, wherein the weights are shown printed on a tape 21, each segregated pair of records relating to a single car. The arrangement and character of the pairs of records may of course vary. While the several weights may be accumulated and only a single total (the sum of the two truck weights) may be printed, it is preferable to have a record by which the weight of each truck may be determined, for use in case of controversy. This record may be either the record of the actual weight of each truck as here shown (Fig. 7) or the record of the weight of one truck (preferably the first truck) and a record of the total from which the weight of the other truck may be obtained by subtraction. Of course, if desired both the individual truck weights and their total may be printed and segregated from the weights of the preceding and following cars as here shown.

The means for segregating the record for each car is here shown in the form of a differential tape control wheel 22. In this case the tape is moved by tape feeding means in 23, and the wheel 22 merely controls the length of tape feed for each record. In this case the wheel is provided with one or more series of notches (one notch for each printed record relating to a given car) so spaced that the unnotched portion 24 of the perimeter of the wheel between each series is different in length (in this case longer) than the distance between adjacent notches 25. For each operation, the wheel rotates and the tape advances a distance represented by the angle from one notch to the next. The result is that the printed records 20 for a given car (two in this case) are segregated, i. e., separated by substantial blank space from the adjacent records. Wheel 22 is released for the aforesaid purposes by a pawl 27 which is momentarily raised (against the bias of spring 28) for each printing operation. This permits the wheel to advance the tape to the next notch, where engagement with pawl 27 arrests further advance. In the present case pawl 27 is advantageously raised simultaneously with operation of the printing hammer 29. As here shown, the hammer carries a projection 30, which on operation of the hammer, is adapted to depress a pin 31 projecting upwardly from pawl 27, the fulcrum of the latter being at 32. The printing hammer operates with almost an instantaneous contact with the tape. In other words, the record has been printed and the hammer raised before the tape can advance, thereupon, the tape is advanced for the next record.

It will be understood that the track lever 15 or other wheel actuated device controls operation of printing hammer 29. One well known mechanism for this purpose is shown in said Wiley patent. In the drawings the dotted line 33 represents the mechanical or electrical connection between the track lever or switch and the printing hammer actuating mechanism 34.

The details of the weight recorder and the method of feeding and printing the tape or other record may be variously modified. The specific recorder here shown, for example, is illustrated in detail in Basquin et al. Patent 2,188,261; but it will be understood that the invention is not limited to a specific recorder or to a specific detail of the recorder.

Figs. 1 and 2 illustrate diagrammatically the relation between car dimensions and the scale in weighing in motion and coupled together of a train of cars of widely varying dimensions. As suggested above, the optimum length of the weighrail 10 is determined by the maximum truck dimensions 11 and the minimum distance between wheels of adjacent trucks. This distance in present cars (and probably in future cars) is the so-called outboard dimension 12, i. e., the distance between the trailing wheel of the last truck and the leading wheel of the front truck of the following car. This distance (generally varying between six and eight feet) is less than the distance 13 between inner wheels of the car 35 having the shortest wheel base (about 20 feet), and is therefore the controlling minimum distance. The car trucks have fairly uniform wheel base dimensions, not varying greatly from 5½ feet. The weighrail is therefore advantageously the sum of the maximum truck base plus the minimum outboard length. It may be less with a corresponding reduction of the time the truck is scale borne alone, and if it be greater, then the track lever or switch 15 for actuating the recorder must be set inwardly of the far end of the weighrail. Thus the weighrail cannot profitably exceed the above defined optimum length. This is illustrated in Figs. 1 and 2, the former showing the truck when it is first scale borne, and the latter showing the leading wheel engaging the track lever 15 before the following truck engages the rail. The several dotted weighrails 10 (representing the relation of the truck when it is on the weighrail) show that the weighing operation is uniform regardless of variations in car length. This has been illustrated in connection with the rear truck only, since no minimum dimensions are involved in weighing the front truck for reasons above given.

Thus, the train speed may be kept constant and special treatment is not necessary for cars of special length, either long or short. All cars of whatever length may be weighed coupled together, and each truck is scale borne for the same length of time. The resulting record of a car weight is therefore just as accurate as though the entire car had been scale borne for a length of time necessary to obtain an accurate weight. Impairment of accuracy due to variation in car length is, of course, avoided.

A short weigh span (length of weighrail) greatly reduces cost of construction, since lighter structural members may be used. Of equal importance is the elimination of the need for the so-called dead rail (separate rails, not scale borne) for the locomotive, to protect the scale. In the present case due to the short weigh rail, only a portion of the locomotive is scale borne at any instant. The scale is well able to carry a portion of the locomotive weight but not its entire weight.

In Figs. 4 and 5 is illustrated the weighing of cars in motion but uncoupled. Fig. 4 shows the first truck and Fig. 5 the second truck, upon completion of weighing, i. e., engagement of the track lever or switch. In this case, each car moves separately over the scale. The motive power may be gravity (as in a hump yard here illustrated) or simply the momentum given the car before it reaches the scale or some other mechanical device for moving the car. In railroad yards gravity or hump weighing is generally employed, but as stated above, this practice has heretofore been hazardous to personnel and wasteful of man and motive power. According to the method illustrated in Figs. 4 and 5, the cars do not require special treatment on account of variation in length, that is weighing procedure is independent of car length or variation in car length. As here shown, each truck is weighed separately on a short weighrail 40 whose length approximates the minimum wheelbase. In gravity weighing here illustrated, each car is separated from the train at the apex 41 of the hump and moves by gravity across the scale at such speed as to permit each truck to be scale borne separately for an adequately long time before the leading wheel reaches the track lever or switch 42 which controls operation of the recorder.

The optimum length of weighrail for this method (as shown in Figs. 4 and 5) is approximately the distance between truck centers of the shortest car to be weighed. Thus the maximum speed which can be used and still allow the scale to come to balance before the weight is recorded will be determined by the length of the weigh rail effectively used as compared with the truck length. Stated in other words, the speed at which cars can be weighed on the scale will be a function of the length of the weighrail as compared to the truck length and will be independent of the distance between the car trucks of any particular car. At the present time this is approximately 21 feet. A shorter length weighrail reduces the length of time the truck is scale borne (without reducing car speed) and a longer weighrail would require the track lever or switch 42 to be located inwardly so that it would be engaged by the leading wheel to actuate the recorder before any part of the trailing truck engaged the weighrail. It should be understood that the weighrail may be as short as that for coupled weighing, with a corresponding reduction in time the truck is scale borne for a given car speed.

Longer cars involve an interval between the scale borne periods of its trucks, but the trucks themselves are scale borne for the same length of time, regardless of car length.

If the scale be used for both coupled and uncoupled weighing the length of the weighrail is determined by the conditions for coupled weighing.

The involved operations described above, which were heretofore necessary for uncoupled weighing in motion, are unnecessary in the present method. Since variation in speed of the train and need for "spotting" long cars on the scale is not required, the cars may be pushed over the hump from a train of uncoupled cars, making unnecessary the services of a crew man at the apex of the hump for uncoupling the car at the proper instant.

The weight record for each truck may be made as described above in connection with coupled weighing, and with the same apparatus.

Obviously, the invention is not limited to details of the illustrative method and apparatus, since these may be variously modified. Moreover, it is not indispensable that all features of the invention be used conjointly, since various features may be used to advantage in different combinations and sub-combinations.

Having described my invention, I claim:

1. A scale for weighing double truck railroad cars and the like of varying lengths in motion and at a uniform speed which is a function of the scale length to the truck length comprising in combination a scale platform longer than a single truck but shorter than the distance between the inside wheels of the car having the shortest wheel base, a recorder for recording the weight of a truck on the scale platform, and means energized before each truck leaves the platform to operate the recorder to record the weight of such truck, said recorder having mechanism for identifying each pair of truck weights representing the weight of the trucks of each car.

2. Weighing and weight recording apparatus for weighing a succession of railroad cars or the like of different lengths while in motion comprising in combination a scale having a weighing rail of a length less than the distance between the inner wheels of the shortest car but sufficiently longer than a car truck wheel base to permit the truck to be scale borne a sufficient length of time to secure an accurate weight, weight recording means including a movable record tape, means actuated by the leading truck wheel of each truck to actuate the recorder to record the truck weight, and means for advancing the tape after each record so that the pair of records representing the weight of the trucks of a given car are segregated from the records of adjacent pairs of trucks.

3. A track scale for weighing freight cars of varying length and capacity while in motion and while coupled together, said scale comprising a weigh rail, weight recording mechanism for indicating the weight on the weigh rail at given times, said weigh rail being of a length less than the distance between the front wheel axes of front and rear trucks of the shortest car being weighed but sufficiently longer than a car truck wheel base to permit the truck to be scale borne a sufficient length of time to secure accurate weight, and means including a trip mechanism responsive to the position of a car with respect to the weigh rail and operatively connected to the weight recording mechanism, for actuating said weight recording mechanism each time that a single car truck is scale borne, said weight recording mechanism including means for segregating for ready identification the weights recorded by successive trucks.

4. A track scale for weighing freight cars of varying length and capacity while in motion, said scale comprising a weigh rail, weight recording mechanism for indicating the weight on the weigh rail at given times, said weigh rail being of a length less than the distance between the front wheel axes of front and rear trucks of the shortest car being weighed so that the capacity of the scale may be limited to less than the gross weight of any car being weighed, and means including a trip mechanism responsive to the position of a car with respect to the weight rail and operatively connected to the weight recording mechanism for actuating said weight recording mechanism each time that a single car truck is scale borne, said weight recording mechanism including means for segregating for ready identification the weights recorded by successive trucks.

5. A track scale for weighing freight cars of varying length and capacity while in motion and while coupled together, said scale comprising a weigh rail, weight recording mechanism for indicating the weight on the weigh rail at given times, said weigh rail being of a length less than the distance between the front wheel axes of front and rear trucks of the shortest car being weighed but sufficiently longer than a car truck wheel base to permit the truck to be scale borne a sufficient length of time to secure accurate weight, and means including a trip mechanism responsive to the position of a car with respect to the weigh rail and operatively connected to the weight recording mechanism, for actuating said weight recording mechanism each time that a single car truck is scale borne, said weight recording mechanism including means for segregating for ready identification the weights recorded by successive trucks, said last-named means including a moving tape, a tape printing device, a tape control member having differentially spaced shoulders thereon, and a pawl engageable with said shoulders to restrain movement of said member.

6. A track scale for weighing freight cars of varying length and capacity while in motion and while coupled together, said scale comprising a weigh rail, weight recording mechanism for indicating the weight on the weigh rail at given times, said weigh rail being of a length less than the distance between the front wheel axes of front and rear trucks of the shortest car being weighed but sufficiently longer than a car truck wheel base to permit the truck to be scale borne a sufficient length of time to secure accurate weight, and means including a trip mechanism responsive to the position of a car with respect to the weigh rail and operatively connected to the weight recording mechanism, for actuating said weight recording mechanism each time that a single car truck is scale borne, said weight recording mechanism including means for segregating for ready identification the weights recorded by successive trucks, said last-named means including a moving tape, a tape printing device, a tape control member having differentially spaced shoulders thereon, a pawl engageable with said shoulders to restrain movement of said member, a drive for the tape, and means for moving the tape control member synchronously with the tape drive except when said member is restrained by said pawl.

7. A track scale for weighing freight cars of varying length and capacity while in motion, said scale comprising a weigh rail, weight recording mechanism for indicating the weight on the weigh rail at given times, said weigh rail being of a length less than the distance between the front wheel axes of front and rear trucks of the shortest car being weighed so that the capacity of the scale may be limited to less than the gross weight of any car being weighed, and means including a trip mechanism responsive to the position of a car with respect to the weigh rail and operatively connected to the weight recording mechanism for actuating said weight recording mechanism each time that a single car truck is scale borne, said weight recording mechanism including means for segregating for ready identification the weights recorded by successive trucks, said last-named means including a moving tape, a tape printing device, a tape control member having differentially spaced shoulders thereon, a pawl engageable with said shoulders to restrain movement of said member, a drive for the tape, and means for moving the tape control member synchronously with the tape drive except when said member is restrained by said pawl.

HARRY M. ROESER.

REFERENCES CITED

The following references are of record in the file of this patent:

UNITED STATES PATENTS

| Number | Name | Date |
|---|---|---|
| 741,212 | Barclay | Oct. 13, 1903 |
| 778,359 | Goetz | Dec. 27, 1904 |
| 789,846 | Elder | May 16, 1905 |
| 1,494,164 | Goldbeck | May 13, 1924 |
| 1,544,988 | Hutton | July 7, 1925 |
| 1,551,220 | Sheffler | Aug. 25, 1925 |
| 1,821,661 | Miller | Sept. 1, 1931 |
| 1,865,446 | Sears | July 5, 1932 |
| 2,339,152 | Connelly et al. | Jan. 11, 1944 |

FOREIGN PATENTS

| Number | Country | Date |
|---|---|---|
| 536,308 | Germany | Oct. 22, 1931 |